US011893162B1

(12) United States Patent
Fang et al.

(10) Patent No.: US 11,893,162 B1
(45) Date of Patent: Feb. 6, 2024

(54) USING WEARABLE DEVICES TO CAPTURE ACTIONS OF PARTICIPANTS IN A MEETING

(71) Applicant: Zoom Video Communications, Inc., San Jose, CA (US)

(72) Inventors: Jin Fang, Saratoga, CA (US); Qijun Liu, San Jose, CA (US); Kaidong Pei, San Jose, CA (US); Zhenxi Wang, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/101,688

(22) Filed: Jan. 26, 2023

(51) Int. Cl.
*G06F 3/01* (2006.01)
*H04L 65/403* (2022.01)

(52) U.S. Cl.
CPC .............. *G06F 3/017* (2013.01); *G06F 3/011* (2013.01); *H04L 65/403* (2013.01)

(58) Field of Classification Search
CPC combination set(s) only.
See application file for complete search history.

(56) References Cited

U.S. PATENT DOCUMENTS 10,013,805 B2 *  7/2018  Barzuza ............... H04N 13/332

FOREIGN PATENT DOCUMENTS

DE        102015100930 B4 *  6/2019  ......... G06F 3/04842

* cited by examiner

*Primary Examiner* — Vinh T Lam
(74) *Attorney, Agent, or Firm* — Kilpatrick Townsend & Stockton LLP

(57) ABSTRACT

The present disclosure relates to systems and methods for capture actions of users participating within a virtual conference and conveying those actions to participants of the virtual conference. The systems and methods include connecting to at least one wearable device, connecting to a virtual conference device connected to a virtual conference hosted by a virtual conference provider, receiving sensor data from the at least one wearable device, identifying one or more expressions based on the sensor data, and transmitting the identified one or more expressions to the virtual conference device to be provided to the virtual conference provider for conveyance within the virtual conference.

20 Claims, 11 Drawing Sheets

USING WEARABLE DEVICES TO CAPTURE ACTIONS OF PARTICIPANTS IN A MEETING

FIELD

The present disclosure relates generally to using wearable devices to capture movement of users, and more particularly, to capture actions of users participating within a virtual conference and conveying those actions to participants of the virtual conference.

DETAILED DESCRIPTION

Figure 1:
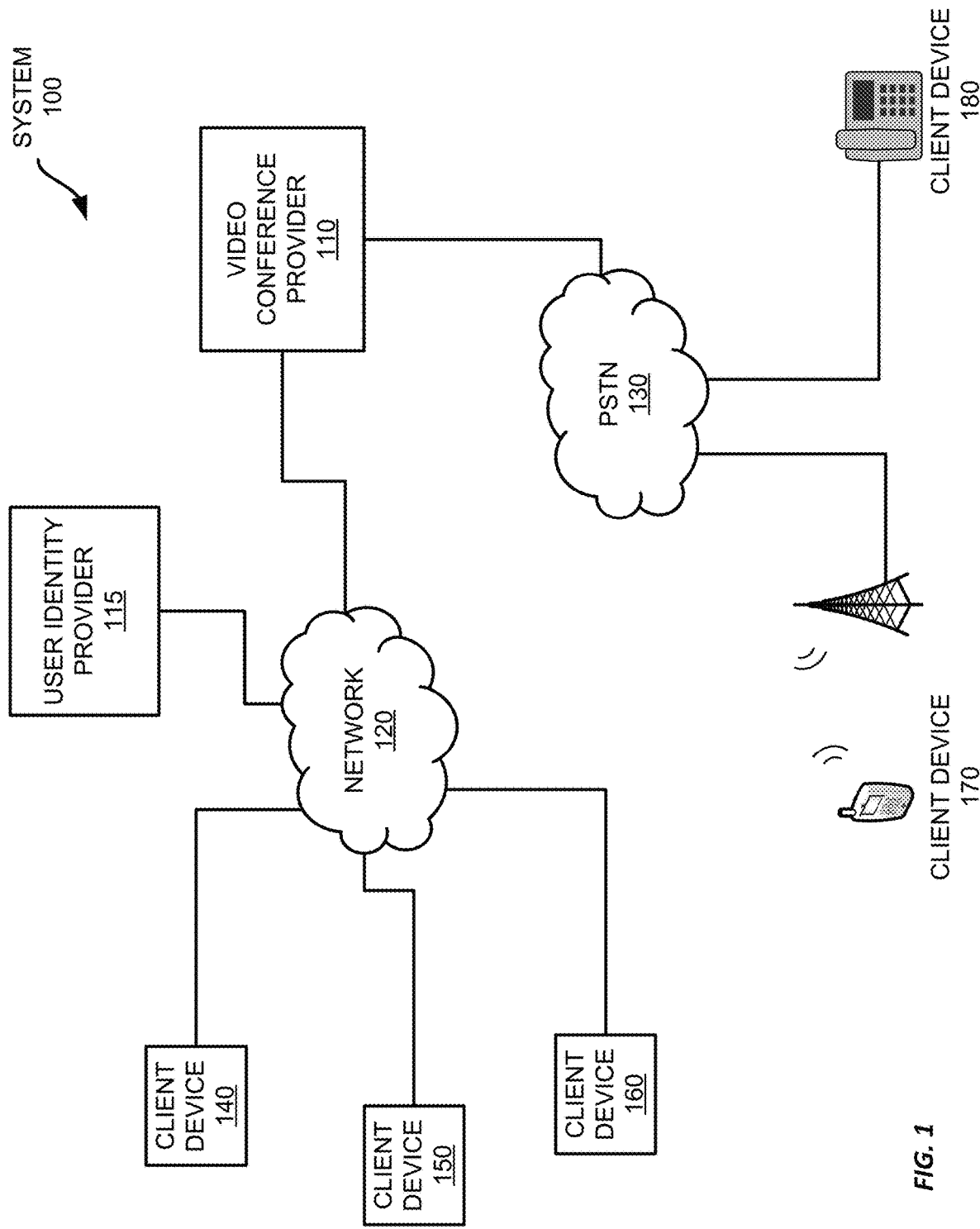
FIG. 1 is an illustration depicting an example video conferencing system in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

During a virtual conference, participants may engage with each other to discuss any matters of interest. Typically, such participants will interact in a virtual conference using a camera and microphone, which provide video and audio streams (each a "media" stream; collectively "multimedia" streams) that can be delivered to the other participants by the virtual conference provider and be displayed via the various client devices' displays or speakers.

Participants may use software applications running on their client devices to join a video conference and use a camera and microphone to provide video and audio streams to the other participants. In some cases, participants may all gather in a larger room, such as a common area, and collectively join a video conference using video conferencing equipment within the room, such as a large display screen on one of the room's walls, one or more microphones positioned on a conference table, and a camera positioned to capture the room and the participants within it.

In settings like these, users may be positioned throughout the room, which may mean that some are positioned near to one of the available camera(s), while others may not be. While participants within the same common area may be able to interact and emote effectively to one another, it may be difficult for those same participants to interact and emote with other users connected to the virtual conference remotely. For example, the physical interactions, body language, facial expressions of participants who are distant from the camera(s) in the common area, may be difficult to convey to participants accessing the video conference remotely. To help to improve participant interaction in such settings, the present disclosure may leverage wearable devices of participants to better capture the physical interactions of the participants. To leverage the data from the wearable devices, the present disclosure may also allow the users to user a personal device, such as a smartphone, paired to the wearable device to provide information from the wearable devices to the virtual conference.

Information from the wearable devices can be interpreted and/or transformed into graphical representations of the physical actions of the wearers and the graphical representations can be provided to the virtual conference for all participants to take in. For example, a participant wearing a smart watch can clap their hands, the motion data can be interpreted by the personal device paired to the watch, and the motion data can be compared to predefined rules to identify a matching graphical representation (or expression) for clapping. In another example, a participant wearing a smart glasses can shake their head, the motion data can be interpreted by the personal device paired to the watch, and the motion data can be compared to predefined rules to identify a matching graphical representation (or expression) for head shaking. Thereafter, the graphical representation for clapping or head shaking can be shared within the virtual meeting. The remote users can then see that at least one of the participants in the common area meeting room is clapping or shaking their head within the context of the rest of the conference. This can provide an immersive virtual conference experience without requiring users to take additional steps to input their own expressions (e.g., via a shared input device). As a result, the user can be clearly heard by the other participants in the video conference and the experience is improved for all of the participants.

This illustrative example is given to introduce the reader to the general subject matter discussed herein and the disclosure is not limited to this example. The following sections describe various additional non-limiting examples and examples of using wearable devices capture actions of users participating within a virtual conference and conveying those actions to participants of the virtual conference.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
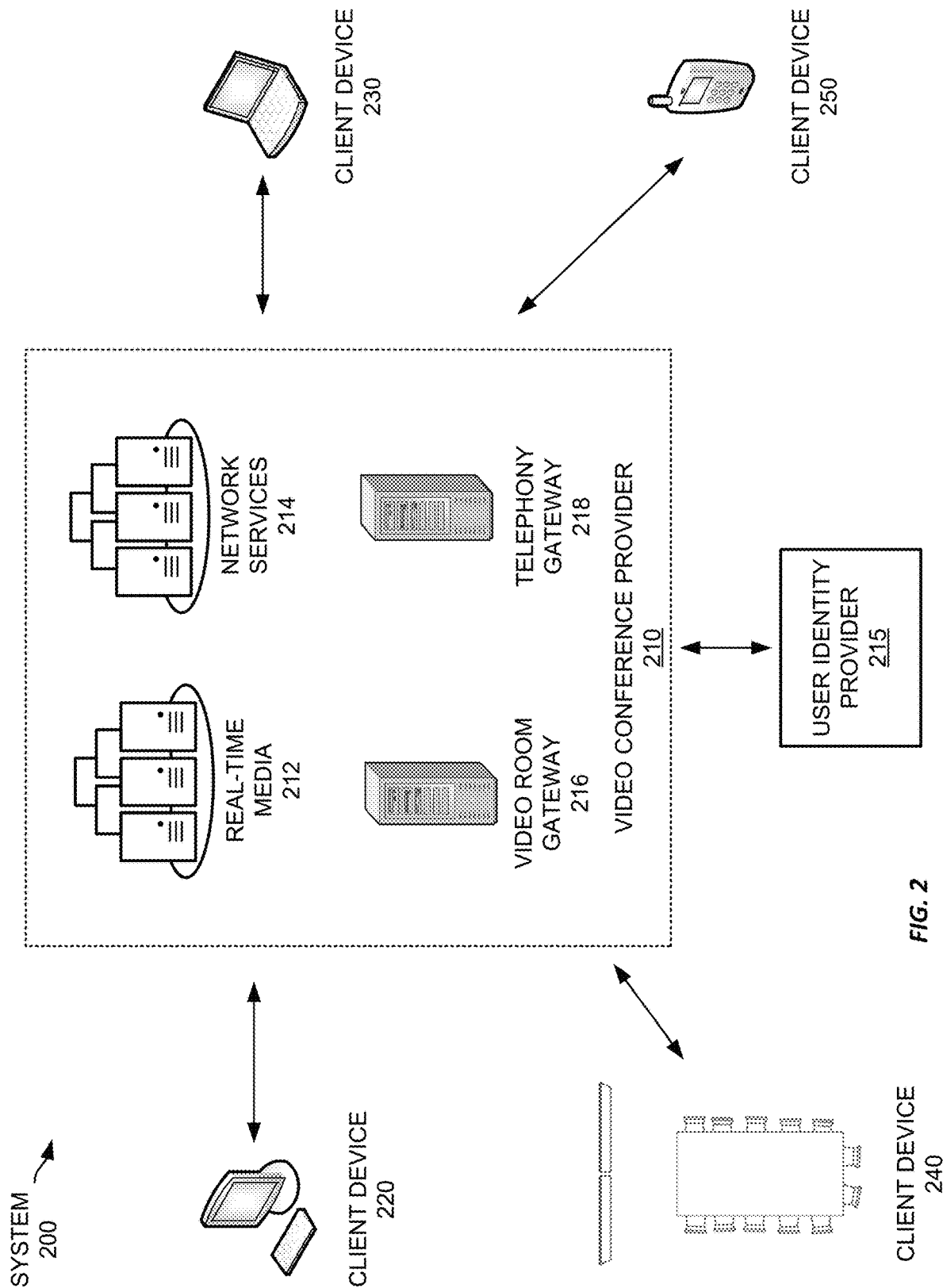
FIG. 2 is an illustration depicting an example video conferencing system in accordance with various embodiments.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 80), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 80-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
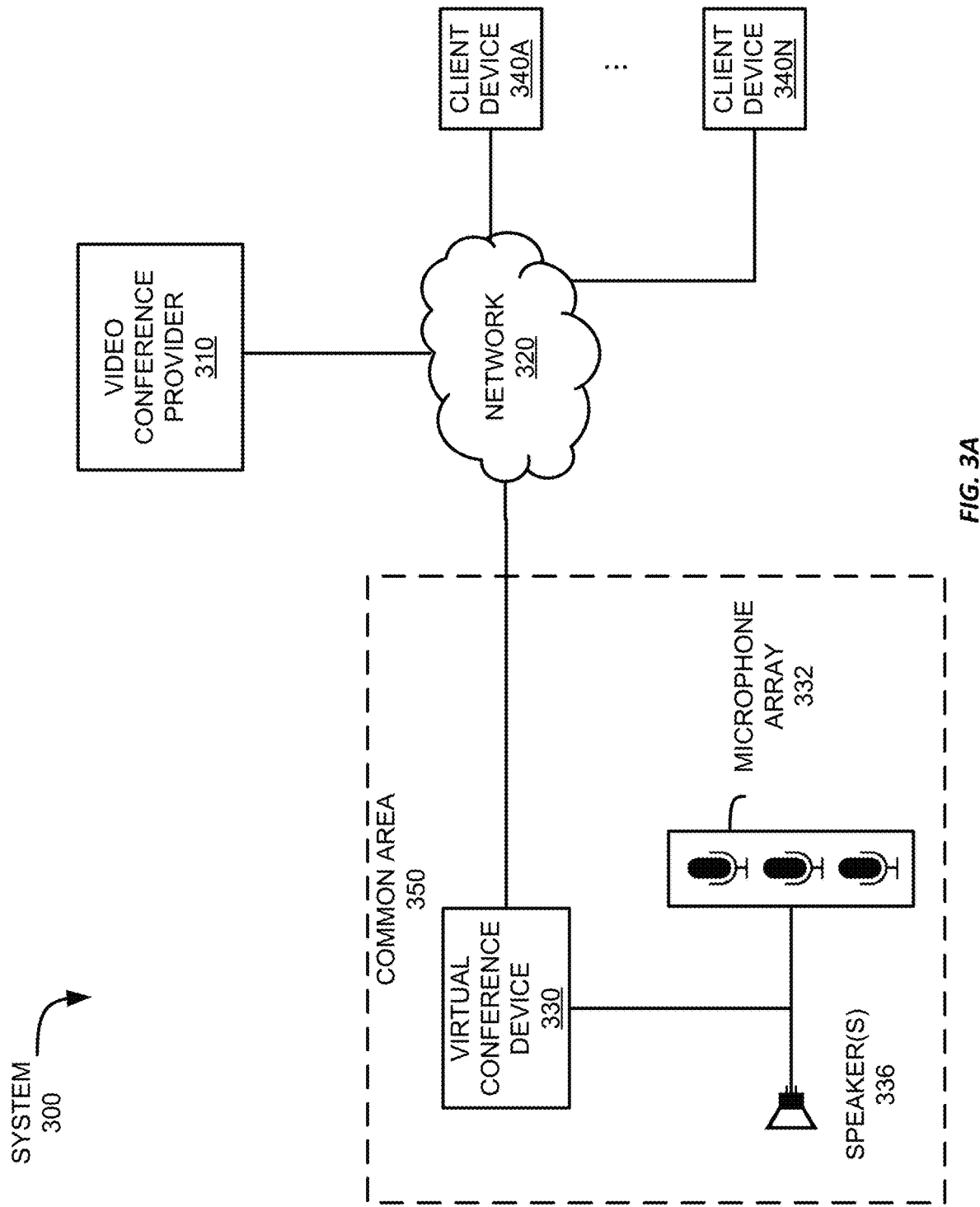
FIGS. 3A and 3B show examples systems for using wearable devices capture actions of users participating within a virtual conference.
Figure 3B:
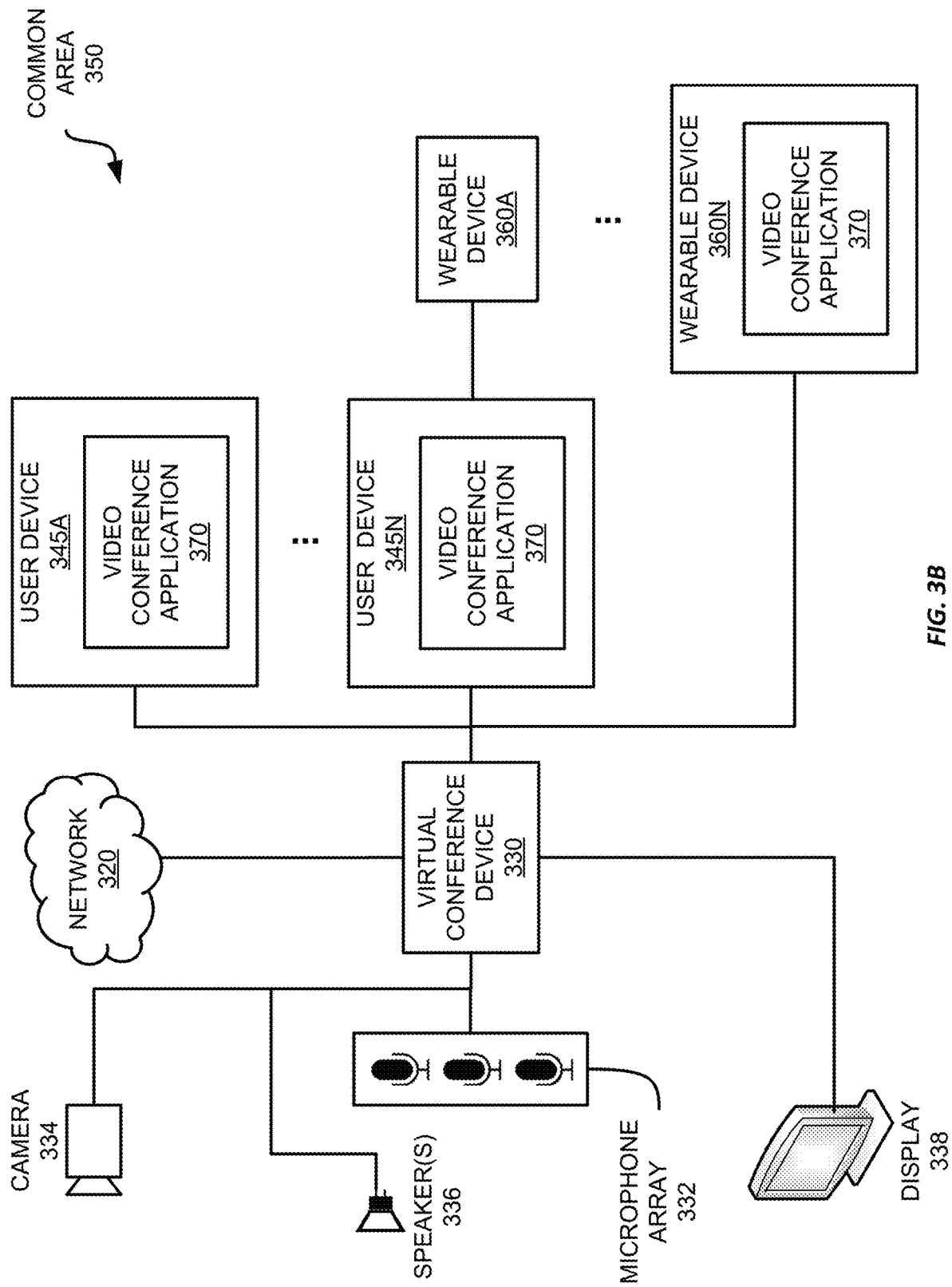

Referring now to FIGS. 3A-3B, FIG. 3A shows an example system 300 for capturing actions of participants through wearable devices within a virtual conference. In this example system 300, a virtual conference device 330, a number of client devices 340a-n connected to a video conference provider 310 via a communications network 320. The client devices 340a-n can be similar to client device 220, 230, 240 in FIG. 2. In this example, the communications network 320 is the internet, however, any suitable communications network or combination of communications network may be employed, including combination of a mobile network, WAN, LAN, or other type of network. The communications network 320 may be used to exchange data between the virtual conference device 330, client devices 340a-n.

In this example, virtual conference device 330, similar to client device 220, 230, 240 in FIG. 2, provides video conferencing functionality to a group of people assembled in a common area 350, such as a conference room. The virtual conference device 330, in this example, includes a computing device, camera(s), a microphone array 332, and one or more speakers 336 installed within a common area 350. Thus, while the virtual conference device 330 operates as a client device, coupled to camera(s), a microphone array 332, and one or more speakers 336, the hardware components of the virtual conference device 330 may be dispersed throughout the common area 350 to enable multiple people to join from the common area 350, rather than a personal client device, such as a smartphone, tablet computer, or laptop computer. The virtual conference device 330 has virtual conferencing software installed on it to enable it to connect to virtual conferences hosted by the virtual conference provider 310, to capture audio and video data using the microphone array 332 and camera(s) (not shown), and exchange audio and video streams with other participants via the virtual conference provider 310. While the virtual conference device 330, in some examples, may include dedicated video conferencing equipment as discussed above, in other examples, it may be a conventional computing device, such as a desktop or laptop computer, or a handheld device such as a tablet or smartphone.

Each client device 340a-n executes video conference software, which connects to the video conference provider 310 and joins a meeting. During the meeting, the various participants, via their respective client devices 340a-n, are able to interact with each other to conduct the meeting, such as by viewing video streams and hearing audio streams from other participants, and by capturing and transmitting video and audio of themselves. Therefore, using the system 300 enables both users assembling a common area 350 to participate in a virtual conference with other users located at remote locations, accessing the virtual conference through their respective client devices 340a-n. Although FIG. 3A depicts the virtual conference device 330 operating as an endpoint to deliver a virtual conference to users assembled around it, the users within the common area 350 may also have their own user devices 345a-n, as shown in FIG. 3B, which can be similar to the client devices 340a-n and can be used to provide added functionality to the virtual conference. Although user devices 345a-n and client devices 340a-n can be implemented using similar devices, for purposes of this disclosure, the user devices 345a-n may refer to personal user devices that are used within the common area 350 but are not necessarily relied upon for delivering the virtual conference (provided by the virtual conference device 330) whereas the client devices 340a-n may be used by other participants of the virtual conference that are situated remotely from the common area 350. The user devices 345a-n can include a virtual conferencing application 370 to allow participants to use their user devices 345a-n as input/out devices as well as share data with the video conference provider 310 (for use in the virtual conference) via the virtual conference device 330.

Referring now to FIG. 3B, FIG. 3B shows a more detailed view of the common area 350 including the virtual conference device 330 and the user devices 345a-n. In this example, the virtual conference device 330 has one or more cameras 334 and one or more microphone arrays 332 to allow the user to provide data to the video conference, via the virtual conference device 330. In addition, the virtual conference device 330 executes a virtual conferencing application 370 to allow participants to join and participate in video conferences hosted by the video conference provider 310, generally as discussed above. The virtual conference device 330 connects to the virtual conference provider 310 using the network interface, which may be a wired interface, such as an Ethernet interface, or a wireless interface, such as a Wi-Fi interface.

However, an issue can arise in virtual conferences when multiple people are grouped together within a shared space using the virtual conference device 330. Specifically, when multiple participants are sharing the same space (e.g., common room 350) during a virtual conference it may be difficult for participants at remote locations (e.g., on client devices 340a-n) to fully interact with all of the people at the common area 350 utilizing a shared virtual conference device 330. While participants at the common area 350 can pass video and audio through the virtual conference device 330 at its related components (e.g., camera(s), microphone array 332, and speakers 336, etc.), it may be difficult to accurately convey other interactions and reactions (e.g., due to distance, crowding, difficulty distinguishing between users, reading the room in its entirety, etc.).

When one or a few participants are interacting during virtual conference, using a client device 340a-n, the participants can intuitively express some emotions to the other participants in the virtual conference through physical actions such as applauding, waving, raising hands, etc. These interactions can be easily conveyed visually to other participants, including those in a common area 350 sharing a client device 340a-n. In contrast, when multiple participants are joining the virtual conference using a shared client device in a common area 350, such as virtual conference device 330, it may be difficult for those participants to interact in a similar fashion with remote participants. For example, while local participants within the common area 350 can interact through physical actions such as applauding, waving, raising hands, etc., it may be difficult for participants accessing the virtual conference remotely (e.g., via their respective client devices 340a-n) to visualize and/or fully appreciate these interactions.

Although participants can interact using verbal communications, using text (e.g., chat), and/or using chat expressions, it is difficult for multiple participants sharing a client device 340a-n (e.g., virtual conference device 330) to access and/or use such functionalities. For example, there may only be one input device to access to input an expression or text into chat and participants may be spread throughout the common area 350 out of reach of an input device. Additionally, it may be difficult for participants to use an input device to interact through an expression function or chat to timely convey some actions and emotions during a virtual conference. If the actions of participants within a common area 350 can be signaled to remote participants in a similar manner to that of the local participants within the common area 350, it will provide a more immersive meeting experience for all participates.

Continuing with FIG. 3B, to help alleviate this issue, the present disclosure is configured to leverage wearable devices 360a-n of people within the common area 350 to track the physical actions (e.g., applauding, raising hands, waving, etc.) of those people and transmit the tracked actions to the virtual conference device 330 and/or the virtual conference provider 310 to be conveyed with remote participants. To enable this functionality the system 300 allows a user's personal wearable devices 360a-n to capture physical actions of the wearer and deliver the captured physical actions to the virtual conference device 330, directly to or through an intermediary device (e.g., user device 345a-n), which can then convey a representation of the captured physical actions to the other participants via the virtual conference provider 310. For example, if a person raises their hand, a graphical hand raise can be presented in the virtual conference, associated with the common area 350 "user."

The wearable devices 360a-n of the present disclosure can include a combination of elements for gathering data, analyzing and manipulating data, communicating the data, and providing information to a user, either directly through the wearable devices 360a-n themselves or through another computing device (e.g., user device 345a-n or video conference provider 310). The wearable devices 360a-n may have a variety of functions, including, but not limited to communicating (in a wired or wireless fashion) with other electronic devices, gathering data from one or more sensors that may be used to initiate, control, or modify operations of the device, monitoring a user's physiological signals, and/or an amount of force exerted on the device, and using either or both as input, accepting voice input to control one or more functions, accepting tactile input to control one or more functions, etc. The sensors of the wearable device 360a-n can include a combination of motion sensors, environmental sensors, biosensors, imaging sensors, etc. The sensors may be implemented as hardware, firmware, and/or in software.

The motion sensors may be configured to measure acceleration forces and rotational forces along one or more axes. Examples of motion sensors include accelerometers, gravity sensors, gyroscopes, rotational vector sensors, significant motion sensors, step counter sensor, Global Positioning System (GPS) sensors, inertial measurement unit sensors, and/or any other suitable sensors. Motion sensors may be useful for monitoring device movement, such as tilt, shake, rotation, or swing. The movement may be a reflection of direct user input, for example, a user raising their hand, clapping, pointing, etc. The motion sensors may return any combination of signals or data related to the movement of the user. For example, an accelerometer may return acceleration force data for the three coordinate axes, and the gyroscope may return rate of rotation data for the three coordinate axes.

The imaging sensors may be configured to observe behavior of a user and the surrounding environment. Examples of imaging sensors can include cameras, infrared sensors, ultraviolet sensors, etc. Imaging sensors may be useful for observing user movement and interactions within an environment. The movement may be a reflection of user actions, for example, a user raising their hand, clapping, pointing, etc. The imaging sensors may return any combination of signals or data related to the movement of the user. For example, the imaging sensors can capture movement of a user's hands/arms and provide vectors, motion capture, etc. related to the movement of a user.

The wearable devices 360a-n may also include a display providing a graphical user interface through which the wearer of the device may receive information and/or alerts. The display may also be an input device through which a user can interact with one or more functionalities of the wearable devices 360a-n. For example, the display can be a touch screen that the wearer can interact with. For example, the touch screen may be configured to change the text or other information visible on the display.

The wearable devices 360a-n can include any combination of devices, such as for example, smart watch, smart jewelry (e.g., bracelet, ring, necklace, anklet, etc.), glasses or goggles, clothing, chest strap, patch, etc. Different types of wearable devices 360a-n may include different combinations of sensors. For example, a smart watch can include motion sensors and smart glasses may include a combination of motion sensors or imaging sensors. During the meeting, the various participants wearing wearable devices 360a-n, are able to interact with each other during the meeting through one or more physical actions captured by the wearable devices 360a-n. To share data with the video conference provider 310, each wearable devices 360a-n can connect to a respective user device 345a-n executing the video conference software, which provides a bridge to the video conference provider 310. In some instances, the wearable device 360a-n can execute a virtual conferencing application 370 to connect directly to the virtual conference device 330, without the need of an intermediary user device 345a-n.

Figure 4A:
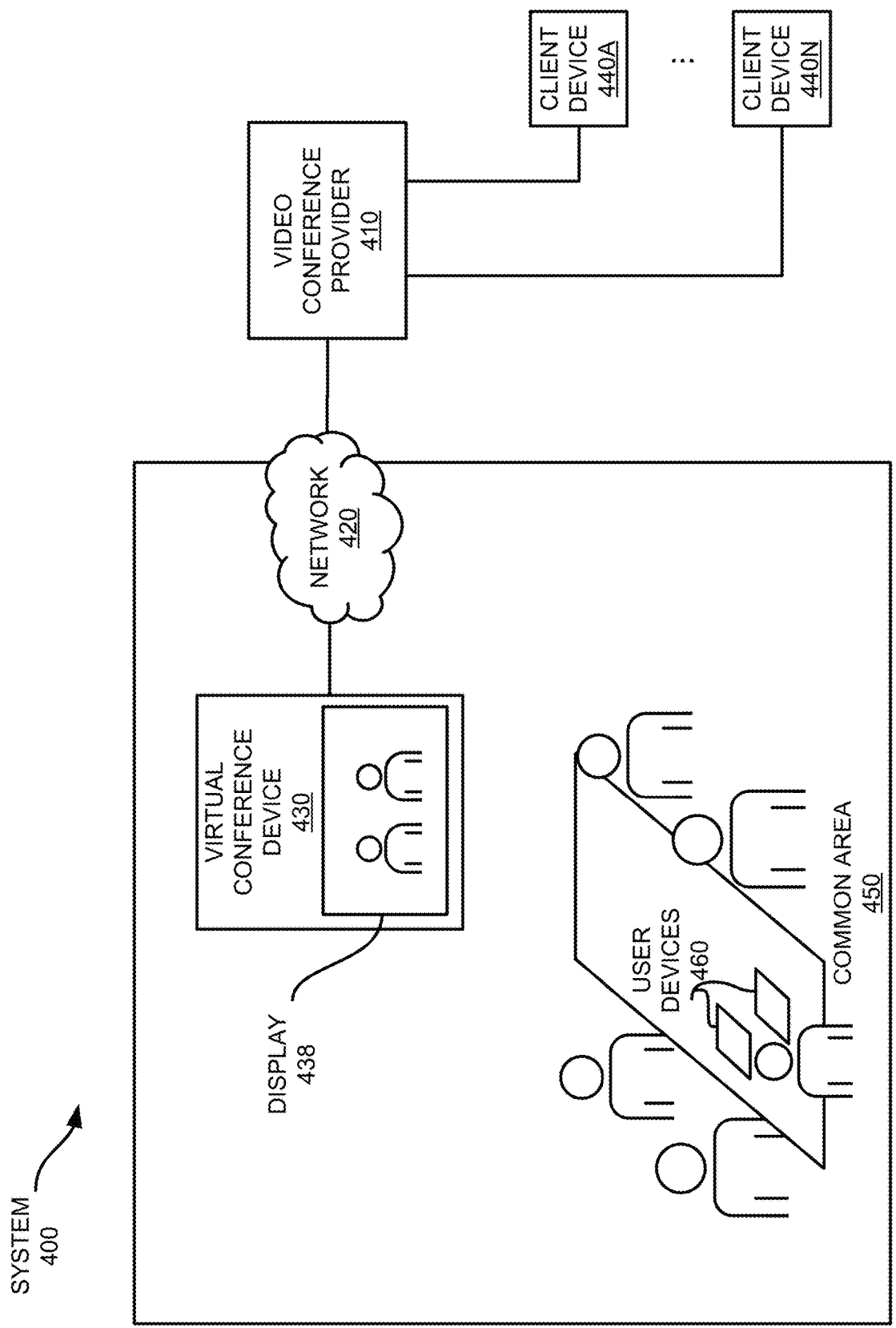
FIGS. 4A and 4B show an example system for using wearable devices capture actions of users participating within a virtual conference.
Figure 4B:
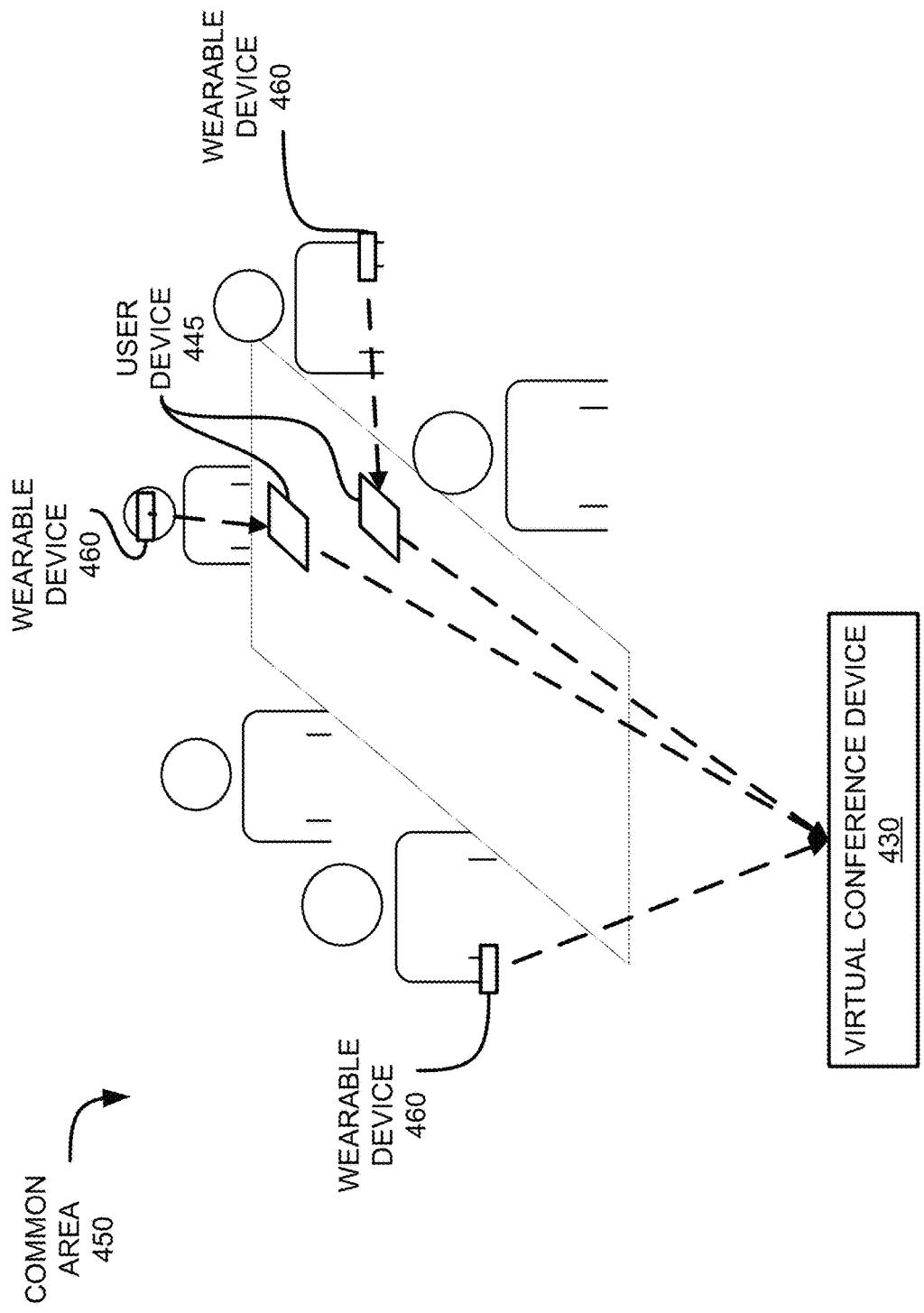

Referring now to FIGS. 4A and 4B, FIGS. 4A and 4B show examples illustrations of a common area 450, such as a conference room, in which multiple people are sitting around a conference table. The people in the common area 450 can connect to a virtual conference using the virtual conference device 430 and can interact with the other participants in the virtual conference using the components (e.g., camera, microphone array, etc.) of the virtual conference device 430 within the common area 450, as shown in FIG. 4A. People outside of the common area 450 can interact with those in the common area 450 using their respective client devices 460 and can be viewed by those in the common area 450 through the display 438. As shown in FIG. 4A, the virtual conference device 430 can connect to a virtual conference via the virtual conference provider 410 through a network 420, as discussed in greater detail with respect to FIGS. 3A and 3B.

In addition to the virtual conference device 430, people in the common area 450 can use their personal (or other) user devices 445a-n to connect to the virtual conference device 430 to provide additional functionality (e.g., audio input, text input, audio output, etc.). As discussed above with respect to FIGS. 3A and 3B, the user devices 445a-n may be any suitable user device, such as a smartphone, tablet computer, or laptop computer, that are configured to load video conference application designed to establish a communication connection with the virtual conference device 430. The user devices 445a-n may be connected to the virtual conference device 430 using any combination of connections, such as a wired network connection (e.g., Ethernet), a universal serial bus ("USB") connection, a firewire connection, or Bluetooth.

Figure 4C:
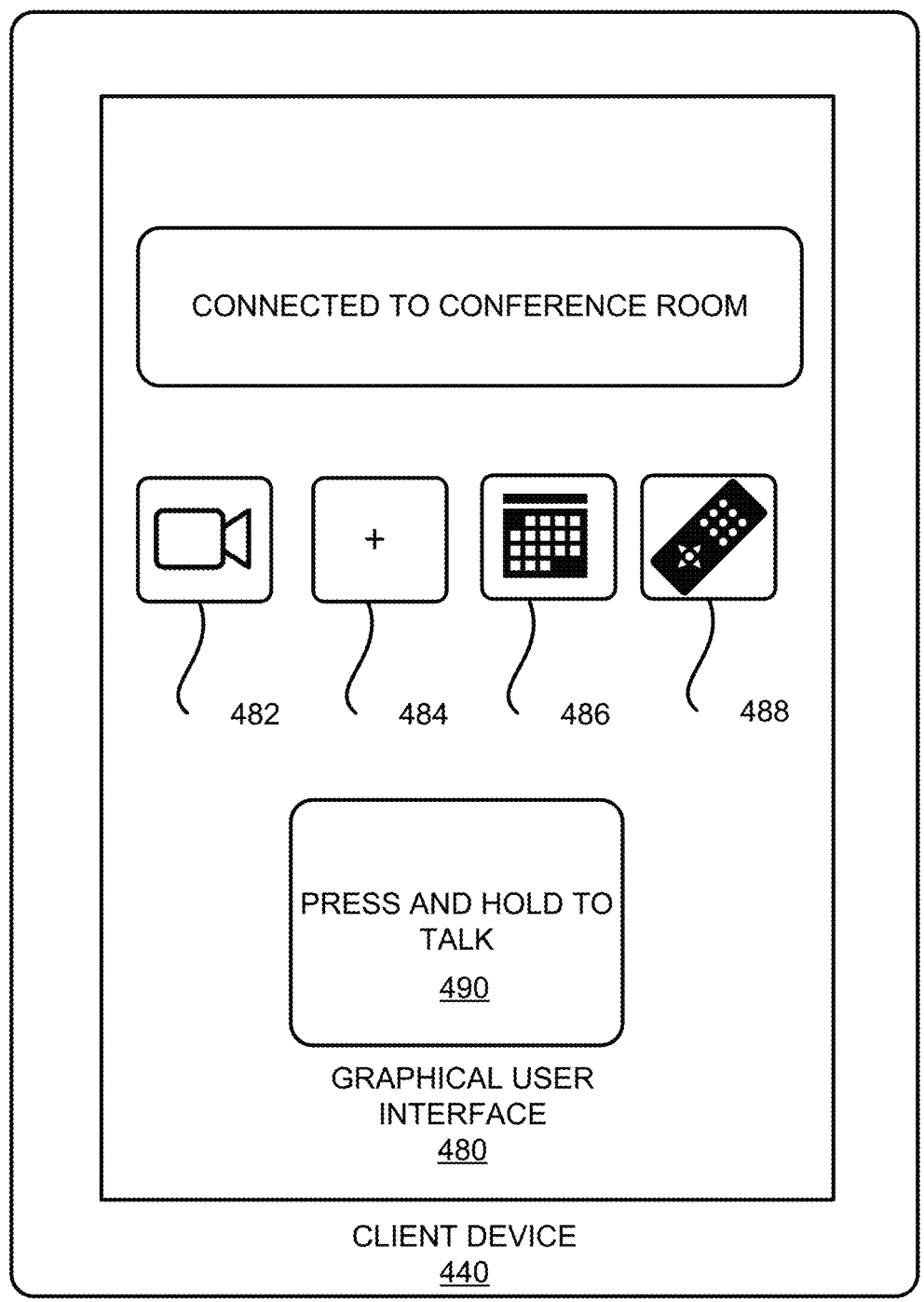
FIG. 4C shows an example graphical user interface for virtual conference application.

To setup the user device 445a-n to provide input for the virtual conference, the user selects an option within a graphical user interface presented by the virtual conference application to connect to the virtual conference device 430, as discussed in greater detail with respect to FIG. 4C. In response to requesting or initiating a connection to the virtual conference device 430, the user device 445a-n receives an ultrasonic signal from the virtual conference device 430 using its microphone. The virtual conference device 430 repeatedly transmits the ultrasonic signal so that any device can receive it when needed. Because the signal was sent ultrasonically, e.g., at frequencies above 20 kHz, it is beyond the hearing range of the people in the common area 450 or attending the virtual conference, but it can be received and processed by the user device 445a-n. The received ultrasonic signals are filtered from the audio data within an audible range, e.g., 60 Hz to 20 kHz, and the user device 445a-n decodes the connection information to connect to the virtual conferencing device 430 via a network interface. The connection information may include a network address such as an IP address of the virtual conference device, a passcode, a URL, or other information to enable the participant's user device 445a-n to connect to the virtual conference device 430.

In this example, because the user device 445a-n communicates via ultrasound, the user may not need to select a particular virtual conference device since ultrasound may not easily travel through walls to virtual conference devices in adjacent common areas 450. However, in some examples, a user may be presented with one or more available virtual conference devices 430 to connect to, from which the user may then select the appropriate device 430. Similarly, it should be appreciated that while in this example, the virtual conference device 433 repeatedly transmits the ultrasonic signal, in some examples the virtual conference device may only transmit the ultrasonic signal in response to a request from a user device 445a-n for connection information. For example, the user device 445a-n may transmit an ultrasonic request for connection information, which the virtual conference device 330 may receive using its speakers. The virtual conference device 330 may then generate and transmit the ultrasonic signal including the connection information as discussed above.

While in this example, the user device 445a-n obtains the connection information using ultrasound transmissions, other techniques may be used. For example, in some examples, the network interface may include a wireless connection such as Bluetooth interface, near-field communication ("NFC") interface, or a wired interface, such as a universal serial bus ("USB") interface. Thus, the user device 445a-n may be able to connect to the virtual conference device 430 via the Bluetooth interface to obtain connection information, generally as discussed above, and then use the connection information to connect to the user device 445a-n via another network connection, such as via Wi-Fi as discussed above. In some examples, the user device 445a-n may use its camera (not shown) to capture a quick response ("QR") code or bar code affixed to the virtual conference device 430 that provides connection information to the virtual conference device 430. It may then use the received connection information to connect to the virtual conference device 430.

After establishing a connection between a user device 445*a-n* and the virtual conference device 430, the virtual conference device 430 can identify a user associated with the user device 445*a-n* as a participant within the common area 450. The user identification can be generic (e.g., a user within the common area 450 is participating in the virtual conference) or the virtual conference device 430 can specifically identify the user of the user device 445*a-n*. The identification of the specific user can be performed using any combination of methods. For example, a user can be signed into the video conference application (e.g., video conference application 370) on the user device 445*a-n* and the user login can be used to specifically identify the user as participating in the virtual conference from the common area 450. Within the virtual conference the virtual conference device 430 can be identified as participating within the virtual conference (e.g., listed as "common area"), and if other users are identified they can also be identified as participating within the virtual conference (e.g., as a subset of the "common area" identifier) such that remote users will be able to identify at least some of the people in the common area 450 as participants. As would be appreciated by one skilled in the art, the wearable devices 460*a-n* can also be able to connect directly to the virtual conference device 430 using a similar series of steps. For example, if the virtual conference device 430 is able to download, install, and run a video conference application, then it may be capable of establishing a connection with and exchanging data with the virtual conference device 430.

Figure 5:
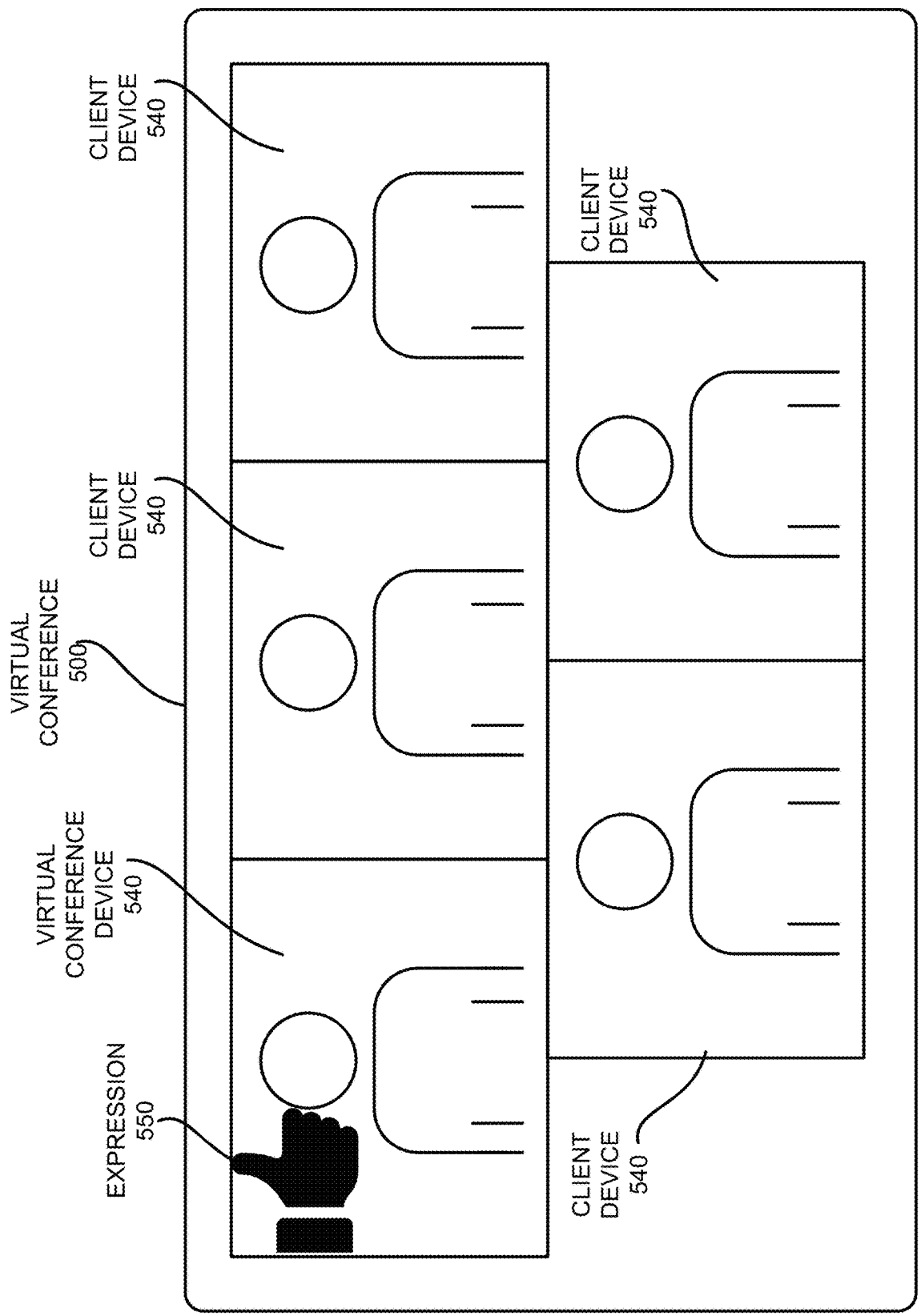
FIG. 5 shows an example graphical user interface for virtual conferences.

Referring to FIG. 4B, once a connection is established between the user device 445*a-n* and the virtual conference device 430, additional functionality can be enabled. For example, the user device 445*a-n* may then begin capturing and transmitting data to the virtual conference device 430, The data can be provided to the virtual conference device 430 to be conveyed as part of the virtual conference. The data can include any combination of data, such as textual data, audio data, video data, etc. The data can also include data to be provided as one or more expressions to be displayed during the virtual meeting. The one or more expressions can include any combination of audio-visual representation that can be provided through the virtual conference. For example, the one or more expressions can be graphical representations for a physical action such as a pictogram, logogram, ideogram or emoji that is used to fill in emotional cues otherwise missing from typed and/or spoken conversation. The one or more expressions can be represented at any combination of locations within the virtual conference. For example, the one or more expressions can be inserted within a chat window or they can be overlayed on top of the video screen. When overlayed on the video screen, the one or more expressions can be positioned such that they are related to the user(s) providing the one or more expressions. For example, if the one or more expressions is provided via the virtual conference device, then the section of the screen associated with the virtual conference device 430 will include the expression overlayed thereon (as shown in FIG. 5).

The user device 445*a-n* can share data originating from other sources with the virtual conference device 430. In one example, the user device 445*a-n* can leverage the capabilities of one or more connected wearable devices 460*a-n* to trigger the one or more expressions. To leverage the capabilities of wearable devices 460*a-n*, the user device 445*a-n* may establish a connection or pairing with a wearable device 460*a-n* such that it can receive data and share the received data with the virtual conference device 430. The connection can include any combination of connections between devices, such as a wired network connection (e.g., Ethernet), a universal serial bus ("USB") connection, a firewire connection, or Bluetooth. The connection process can be performed using any combination of connection/pairing methods for the user device 445*a-n* and wearable device 460*a-n*. For example, the wearable device 460*a-n* can be entered into a pairing mode, which makes it discoverable by the user device 445*a-n* and/or a pin can be entered into the user device 445*a-n* to establish the connection. The connection can remain active as long as the devices are in range of one another and the connection is enabled (e.g., active Bluetooth). After the user device 445*a-n* and the wearable device 460*a-n* are connected they can share data according to any combination of protocols and the user device 445*a-n* can store the data and provide the data to any combination of applications on the user device 445*a-n*, such as the virtual conference application, to be accessed and analyzed for their own purposes.

Referring to FIG. 4C, FIG. 4C shows an example graphical user interface (GUI) 480 for the virtual conference application, for example, running on a user device 445*a-n*. The GUI 480 includes several options for the user to select from to enable different functionality. Example options include an option 482 to create a new virtual conference, an option 484 to join an on-going virtual conference, an option 486 to schedule a new virtual conference at a later date and time, and an option 488 to enable data gathering from a connected wearable device 460*a-n*. If the option 488 is selected, any data received, by the user device 445*a-n*, from the wearable device 460*a-n* can be accessed by the virtual conference application on the user device 445*a-n*. As would be appreciated by one skilled in the art, the wearable devices 460*a-n* can run a similar graphical user interface, or one specifically designed for a wearable device, to connect directly to the virtual conference device 430 using a similar series of steps.

As discussed in greater detail herein, the wearable device 460*a-n* can be configured to provide any combination of data related to movement, location, orientation of the wearable device 460*a-n* as well as video and/or audio captured by the wearable device 460*a-n*. The user device 445*a-n* can relay the data received from the wearable device 460*a-n* to the virtual conference device 430 unmodified (to perform processing of the data) or it can perform some processing on the data prior to transmitting it to the virtual conference device 430 and/or the video conference provider 410. The processing can be performed to interpret and/or transform the data received from the wearable device 460*a-n* and the processing can vary depending on the type of wearable device 460*a-n* and the type of data that the wearable device 460*a-n* is providing. Additionally, the different types of data may require different processing, for example, motion and orientation data received from the wearable device 460*a-n* will be processed differently than video data.

The data received from the wearable device 460*a-n* can be interpreted and/or processed using a pre-defined set of rules or pattern recognition, for example, executed by the video conferencing application (e.g., video conferencing application 370 on user device 445*a-n*). The pre-defined set of rules or pattern recognition can be any combination of rules or pattern matching techniques and can vary depending on the type data being received form the wearable device 460a-n. For example, movement data from a wearable device 460a-n can be compared against predefined movement patterns to identify, match, predict an action, gesture, or movement of a wearer. The action, gesture, or movement can be associated with an audio or video representation of an expression that can be conveyed as an input during the virtual conference. For example, if movement and orientation data received from a wearable device 460a-n matches a predefined movement and orientation of a physical thumbs up action or a clapping motion, then a thumbs up expression or an applause expression can be selected for conveyance within a virtual conference. Other types of expressions can be determined as well, such as a user raising a hand, shaking their head, nodding their head, waving their hand, standing up, sitting down, or making a thumbs-down gesture.

Similarly, the type of the wearable device 460a-n can influence how the data is interpreted and/or processed. For example, a smart watch wearable device 460a-n can provide motion data including movement and orientation of the smart watch that may be correlated to hand movements of a wearer whereas a smart glasses can provide movement and orientation of the smart glasses that may be correlated to head movements of a wearer. The type of the wearable device 460a-n can help in distinguishing between which expressions to convey. For example, lateral back and forth movement data for a smart watch may indicate that a user is clapping, whereas lateral back and forth movement data for smart glasses may indicate that a user is shaking their head. Such distinctions can be provided by the predefined set of rules associated with different types of wearable devices.

The data is interpretation and/or processing can also change depending on a number of repeated actions. For example, one lateral back and forth movement may indicate that a user is giving a thumbs up, three lateral back and forth movements may indicate that a user is clapping, five lateral back and forth movements may indicate that a user is celebrating, etc. Each of the different user reactions can be represented by a different expression. For example, "thumbs up" can be represented by a thumbs up graphic, clapping can be presented by two hands facing one another, celebrating can be represented by fireworks, etc. By distinguishing between single unintentional actions and intentional repeated (or specific) actions, the virtual conference application can limit triggering expressions in response to simple repetitive gestures rather than unintended body movements.

Different types of wearable devices 460a-n can include similar rules or patterns or distinct rules depending on where the devices are positioned on a wearer and the types of sensors the devices include. Devices worn proximate to a hand, wrist, arm, such as a smart watch, smart wrist band/bracelet, smart ring, etc. can include similar expressions associated with a combination of predefined motions. For example, each of these devices can associate a lateral back and forth movement with clapping, a vertical down to up movement with a hand raise, a vertical down to up movement with back-and-forth movement can be a waving, a forward and backward movement with beckoning, a vertical down to up movement with rotation can be a thumbs up, etc. Devices worn proximate to the head, such as smart glasses, earrings, headband, etc. can include their own set of similar expressions associated with a combination of predefined motions. For example, each of these devices can associate a lateral back and forth movement with head shaking, a vertical down to up movement with nodding, a vertical down to up movement with back-and-forth movement can be a waving, a forward and backward movement with beckoning, etc.

Similar devices that include different combinations of sensors providing different types of data can also influence the type of expressions that can be identified. For example, capturing video data from smart glasses can view and interpret the hand movements and finger movements to identify more granular expressions than relying on motion alone. For example, video data can be used to distinguish between a thumbs up, a peace sign, pointing, etc. Additionally, multiple different wearable devices 460a-n can be used in conjunction to identify different expressions. For example, a smart watch can capture back and forth motion of one hand (hand wearing the smart watch) and smart glasses can capture video of both hands, such that the virtual conference application can use the combined data from both wearable devices to identify a clapping expression, rather than other one-handed expressions, such as if only the smart watch data was being used.

The distinction between different wearable devices 460a-n can be provided in any combination of methods. For example, each wearable device 460a-n type can have its own table (e.g., stored within or accessed by the virtual conference application) with different predefined patterns or rules therein for that wearable device. As such, the data can include the type of device, directing to a particular table, then the movement, audio, video, etc. data can be used to lookup the appropriate expression within that table. The different wearable device profiles, patterns, etc. can be stored on the user device 445a-n running the virtual conference application, the virtual conference device 430 running the virtual conference application, at a remote server (e.g., video conference provider 310), or a combination thereof.

Figure 6:
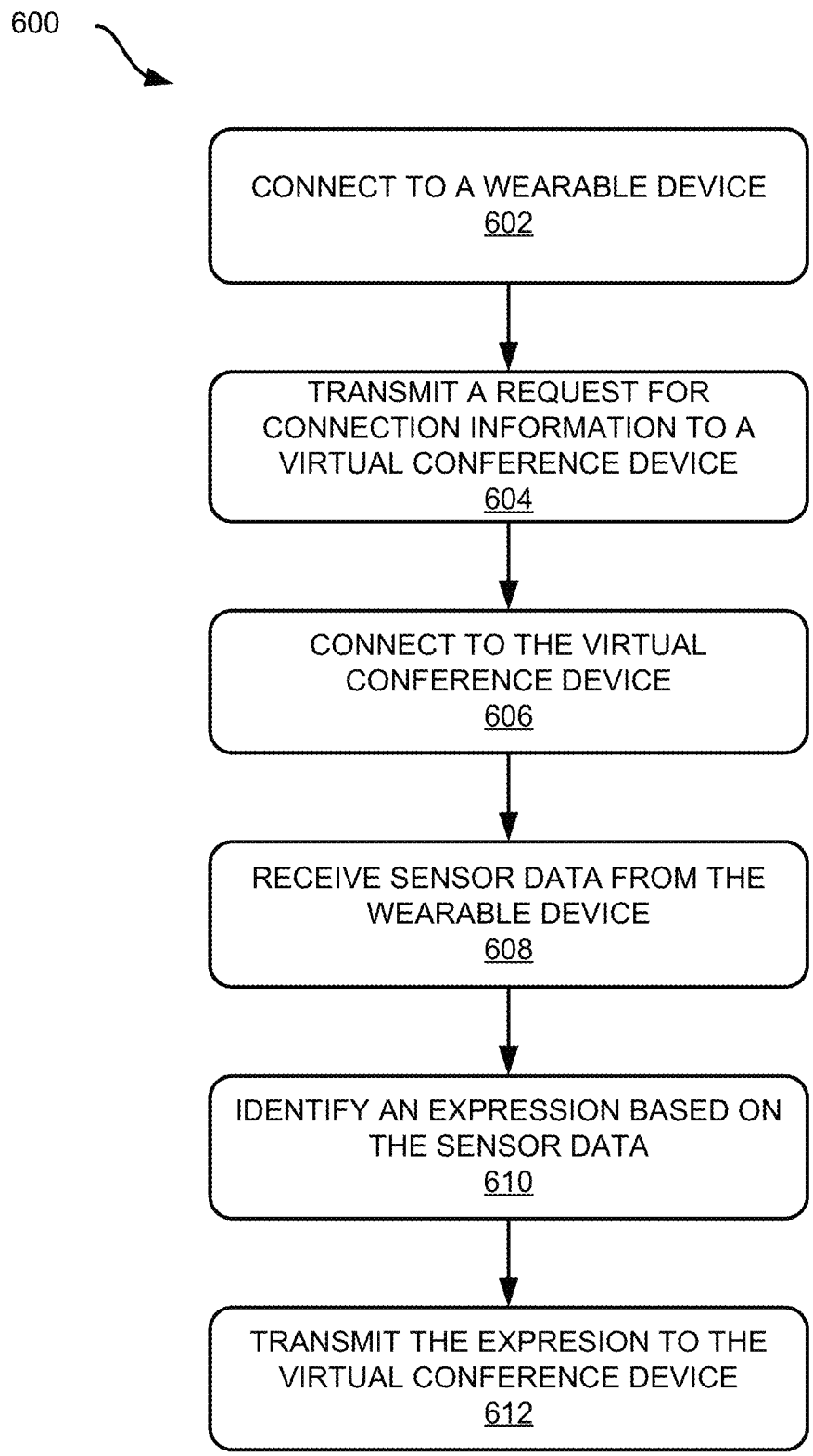
FIGS. 6 and 7 show example methods for using wearable devices capture actions of users participating within a virtual conference.

Referring now to FIG. 6, FIG. 6 shows an example method 600 for using wearable devices to capture actions of users participating within virtual conferences. This example will be described with respect to the system 400 shown in FIGS. 4A-4C; however, any system for virtual conferences according to this disclosure may be employed.

At block 602, a user device 445 initiates and/or receives a request to connect to a wearable device 460. The wearable device 460 and the user device 445 can be connected using any combination of methods. For example, the user device 445 uses a wired connection, Bluetooth, NFC, etc. communication medium to establish a peer-to-peer connection. In one example, the connection can be a pre-existing connection and/or automatic connection that gets established any time both the user device 445 and the wearable device 460 are paired and within range of one another. In another example, the connection can be automatically or manually established through the operating system of the user device 445 and/or through one or more applications running on the user device 445.

At block 604, a user device 445 transmits a request for connection information to a virtual conference device 430. In this example, the user device 445 launches a virtual conference application 450 that includes an option for connecting to available virtual conferences. For example, a user of the user device 445 may select an option 484 in a GUI 480 provided by the virtual conference application 450 to transmit the request to join an on-going virtual conference. To transmit the request, in one example, the virtual conference application can trigger the user device 445 speaker to transmit an ultrasonic signal that can be received by the virtual conference device 430, although any other combination of request mediums can be used to transmit the request, such as Wi-Fi, Bluetooth, NFC, etc. Moreover, in some examples, the user device 445 may not need to transmit a request for connection information. As discussed below, the virtual conference device 430 may repeatedly transmit ultrasonic signals that include connection information. Alternatively, the user device 445 may obtain connection information by optically scanning a QR code or bar code.

At block 606, the user device 445 connects to the virtual conference device 430, generally as discussed above with respect to block 604. The connection through to the virtual conference device 430 can be established using the connection information from block 604. For example, the connection information can include address information and credentials or encryption for establishing a peer-to-peer connection. In some examples, the virtual conference device 430 will first verify the user is authorized to connect to the virtual conference device 430. Once a connection between the virtual conference device 430 and the user device 445 is established, the user device 445 can provide input information (and receive output information from) to the virtual conference through a virtual conference application running on the user device 445. The data shared between the user device 445 and the virtual conference can be facilitated through the connection between the user device 445 and the virtual conference device 430. Additionally, the user device 445 can act as an intermediary device between the wearable device 460 and the virtual conference device 430 providing an expression input to the virtual conference device 430 based on data received from the wearable device 460. The connections between the user device 445 and each of the wearable device 460 and the virtual conference device 430 can be different connection types. For example, the connection to the virtual conference device 430 can be a peer-to-peer or internet connection whereas the connection to the wearable device 460 can be a Bluetooth connection. In some instances, the user device 445 can provide identifying information to the virtual conference device 430, such that the virtual conference device 430 can associated data received from the user device 445 with a particular participant within the virtual conference.

At block 608, the user device 445 receives sensor data from the wearable device 460. The sensor data can be received as part of the normal operation and pairing between the wearable device 460 and the user device 445. Additionally, the virtual conference application running on the user device 445 can request access to the data provided by the wearable device 460 for use within a virtual conference. This access request can be prompted to the user or provided as part of the application's permissions. For example, a user of the user device 445 may select an option 488 in a GUI 480 provided by the virtual conference application to establish data sharing with the wearable device 460. The sensor data can include any combination of information captured by the wearable device 460 and can vary depending on the type of wearable device 460. For example, the sensor data can be any combination of motion, location, biometric, audio, video, etc. data.

At block 610, the user device 445 interprets or otherwise processes the sensor data to determine if any actions should be performed and/or any information should be shared with the virtual conference device 430. For example, the user device 445 can compare the sensor data to predetermined rules or patterns to identify an expression, if any, associated with the sensor data. The predetermined rules or patterns can be designed to identify physical activity of the wearer of the wearable device 460 and can be associated with an expression for that physical activity. For example, if the sensor on the wearable device 460 detects that the wearer is raising and holding the wearable device 460 for more than 5 seconds in a substantially vertical direction over a predetermined distance, the user device 445 can determine this action represents a raised hand which corresponds to a hand raising expression. In another example, if the sensor on the wearable device 460 detects that the wearable device 460 has been shaking three times at a substantially horizontal direction over a predetermined distance, the user device 445 can determine this action represents as applaud expression. Similarly, if the user device 445 detects that a wearer is making a waving motion, the motion data captured by the wearable device 460 may match a predefined pattern for waving which is associated with a graphical representation of a hand waving. In other words, when the user device 445 recognizes data from the wearable device 460 matching a pattern for an expression, the expression is identified.

At block 612, the user device 445 transmits the identified expression to the virtual conference device 430 to be provided to the virtual conference provider 410 for conveyance within a virtual conference. As discussed with respect to method 700 below, the virtual conference device 430 receives the expressions from the user device 445 and transmits the expressions to the virtual conference provider 410 to be conveyed within a virtual conference. The expressions can be associated with the general common area 450 associated with the virtual conference device 430 or it can be associated with a particular user or user device 445 (e.g., using the user device 445 identifier provided to the virtual conference device 430).

Although the method 600 is discussed with respect to using a single user device 445, wearable device 460, virtual conference device 430, etc., any number of and any combination of the devices can be used without departing from the scope of the present disclosure. For example, instead of the wearable device 460 establishing a connection with a user device 445 and the user device determining an expression based on the data received from the wearable device 460, the wearable device 460 can establish a connection directly with the virtual conference device 430 and the virtual conference device 430 can determine the expression or the wearable device 460 can determine an expression based on its own sensor data and provide it to the user device 445 and/or the virtual conference device 430.

Figure 7:
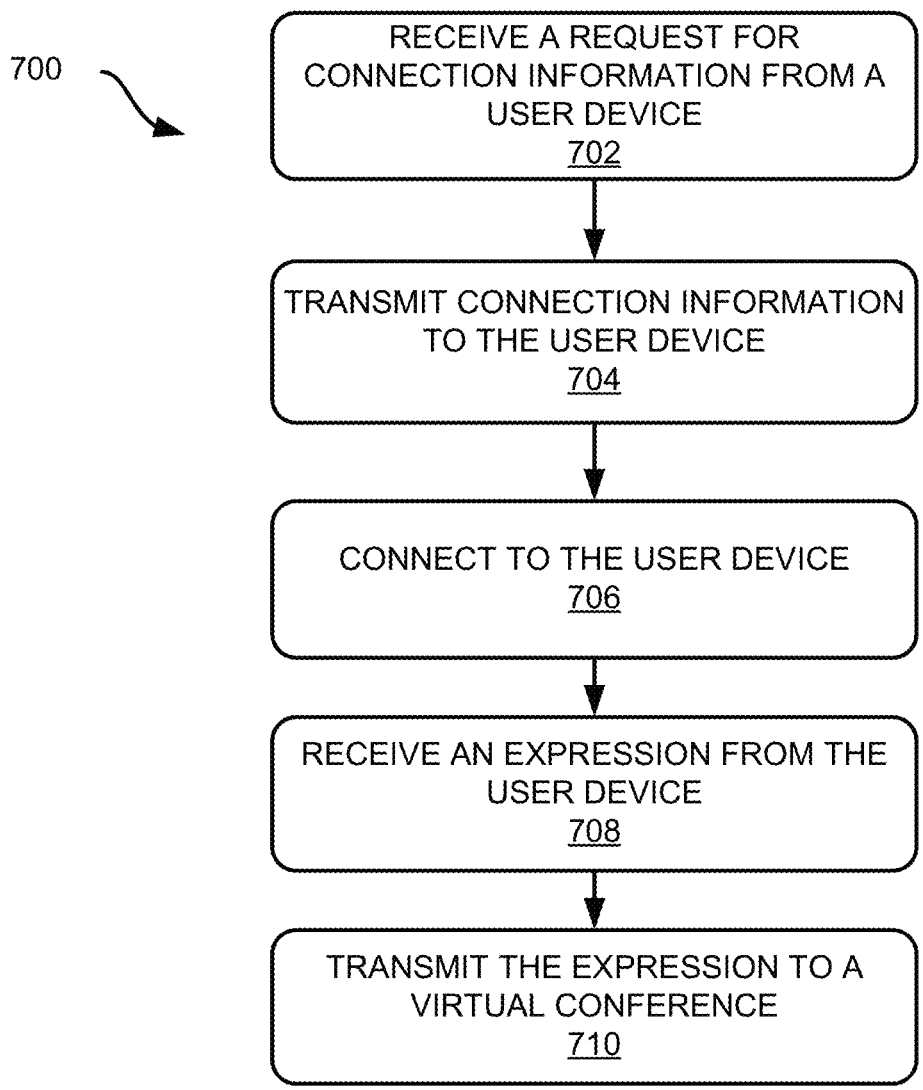

Referring now to FIG. 7, FIG. 7 shows an example method 700 for using wearable devices to capture actions of users participating within virtual conferences. This example will be described with respect to the system 400 shown in FIGS. 4A-4C; however, any system for virtual conferences according to this disclosure may be employed.

At block 704, the virtual conference device 430 receives a request for connection information from the user device 445. The virtual conference device 430 and the user device 445 can be connected using any combination of methods. For example, the virtual conference device 430 can use a microphone array to receive an ultrasonic request signal from a user device 445 and the virtual conference device 430 can transmit connection information to the user device 445 by outputting an ultrasonic signal using one or more of its speakers. The connection information can include any combination of information to enable a network connection between the user device 445 and the virtual conference device 430. For examples, the connection information may include an IP address, a passcode, a URL, etc.

It should be appreciated that in some examples, a user device 445 may not send a request for connection information. Instead, the virtual conference device 430 may repeatedly transmit connection information, such as embedded within an ultrasonic signal such that the user device 445 only needs to receive the ultrasonic signal and extract the connection information. Further, as discussed above, the user device 445 may obtain connection information from QR codes or bar codes affixed to the virtual conference device 430 or through another communication technique, such as Bluetooth, NFC, etc. to establish a peer-to-peer connection.

The request may include any suitable information, such as an identity of the user or an identity of the device. Such information may be used to verify that the user or the device are authorized to connect to the virtual conference device 430. For example, the virtual conference device 430 may maintain or have access to a whitelist of authorized users or devices. If the user or device is present on the whitelist, the virtual conference device 430 may allow the device to connect at block 706 below. Otherwise, it may reject or deny the connection.

At block 706, regardless of how the connection is established, the connection between the virtual conference device 430 and the user device 445 enables the virtual conference device 430 to receive data from the user device 445.

At block 708, the virtual conference device 430 receives an expression from the user device 445 that was received by the user device 445 from a wearable device 460 paired with the user device 445. The expression can include any combination of available expressions created for display within a virtual conference. For example, the expression can be a pictogram, logogram, ideogram, emoji, etc. that represents a physical action of a wearer of the wearable device. The physical cation can include gestures such as thumbs up, clapping, clapping, waving, beckoning, head nodding, head shaking, etc. While the expression may have been identified by the user device 445 processing data from a wearable device 460, the virtual conference device 430 may treat the expression as it would any other expression input. For example, the expression received from the user device 445 interpreting wearable device 460 data can be treated the same as if a user manually input the expression within a chat window at the virtual conference device 430.

In some instances, the virtual conference device 430 can associate the received expression with a user identifier and/or device identifier (user device 445 or wearable device 460). For example, if a user device having a specific identifier (e.g., from step 704) provides an expression, that expression can be associated with the identifier providing the expression.

At block 710, the virtual conference device 430 transmits the expression received from the user device 445 to the virtual conference provider 410 as though the expression had been input into the virtual conference device 430, e.g., through a local input device. Thus, the expression presents to the virtual conference provider 410 as originating from the virtual conference device 430 rather than from the user device 445. Though in some examples, the virtual conference device 430 may include identification information associated with the user device 445 (or wearable device 460), such as a username or a device identifier. In this example, the virtual conference device 430 is connected to a virtual conference hosted by a virtual conference provider 410.

While the operations of processes 600 and 700 are described as being performed by the systems 400, it should be understood that any suitable device may be used to perform one or more operations of this process. Processes 600 and 700 described above) are illustrated as logical flow diagrams, each operation of which represents a sequence of operations that can be implemented in hardware, computer instructions, or a combination thereof. Additionally, any of the blocks can be performed by the various components of the system 400. For example, the blocks can be performed on a server or cloud, on a client computing device, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes 600 and 700.

In operation, participants can enter a shared common area, with some of the participants having wearable devices. To include the functionality discussed herein, the users with wearable devices need to establish the connection between the wearable device and the virtual conference device. The connection can be made directly or through an intermediary device, such as their personal computing device (e.g., smart phone). For example, a participant with a smart watch can run a virtual conference application on their smart phone, paired with the smart watch, to establish a connection with the virtual conference device in the common area. After the connection is established successfully, the virtual conference device will identify the user as the current participant in this common area within the virtual conference. As the participant natural interacts when speaking and/or when physically interacting during a conversations, the wearable device can provide sensor data related to the interactions to the user's device for interpretation. Thereafter, the user's device can identify the user's actions (e.g., the user's expressions) based on an analysis of the received sensor data. Continuing the example, the smart phone can recognize the user's hand movements through the sensors of the smart watch (e.g., applauding, raising hands, clapping, waving, beckoning, etc.) and associated those hand movements with an expression that is viewable in the virtual conference. The viewable expression can then be sent by the user's device to the virtual conference provider via the virtual conference device. Lastly, the viewable expression can be displayed within the virtual conference by the virtual conference provider and all of the users can see that the expression is being conveyed from the common area meeting room.

Figure 8:
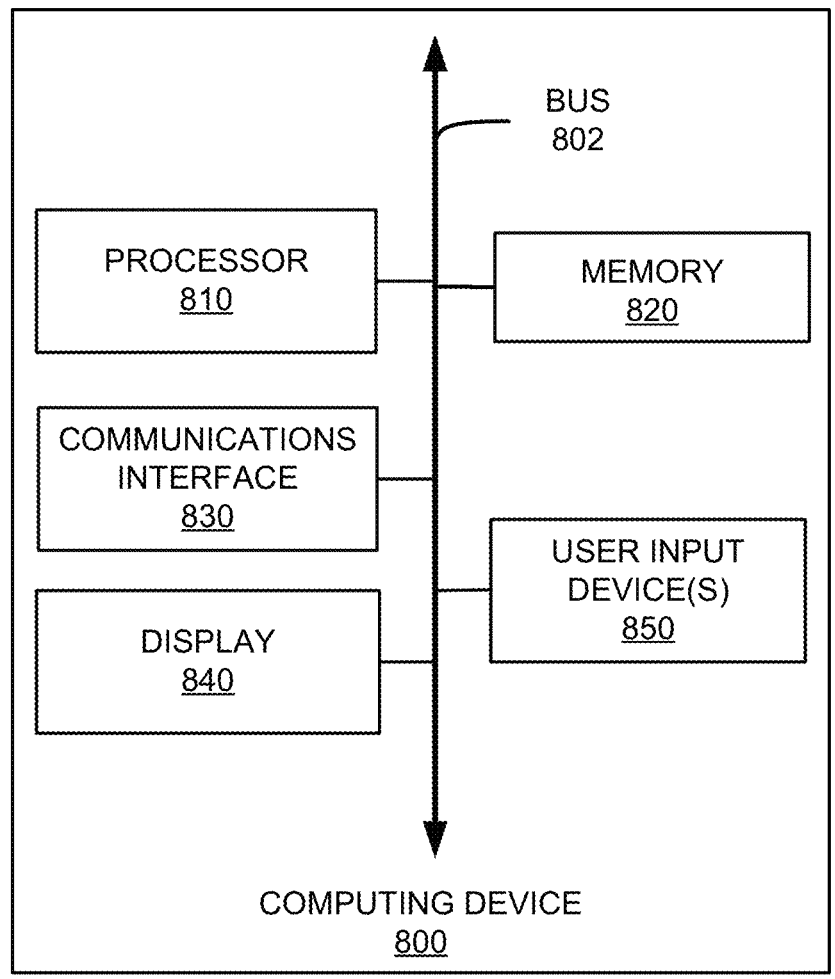
FIG. 8 shows an example computing device suitable for use with systems and methods in accordance with various embodiments.

Referring now to FIG. 8, FIG. 8 shows an example computing device 800 suitable for use in example systems or methods according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for in-meeting follow-up schedulers for video conferences according to different examples, such as part or all of the example methods 600, 700 described above with respect to FIGS. 6 and 7. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes a video conferencing application 860 to enable a user to join and participate in a video conference, such as a conventional meeting or webinar, by receiving multimedia streams from a video conference provider, sending multimedia streams to the video conference provider, joining and leaving breakout rooms, engaging in participant interactions during a virtual, etc. such as described throughout this disclosure, etc.

The computing device 800 also includes a communications interface 840. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method comprising:
connecting, by a user device, to at least one wearable device;
connecting, by the user device, to a virtual conference device connected to a virtual conference hosted by a virtual conference provider;
receiving, by the user device, sensor data from the at least one wearable device;
identifying, by the user device, one or more expressions based on the sensor data; and
transmitting, by the user device, the identified one or more expressions to the virtual conference device to be provided to the virtual conference provider for conveyance within the virtual conference.

2. The method of claim 1, wherein the one or more expressions any combination of a pictogram, a logogram, an ideogram, an emoji or combination thereof presented within the virtual conference and representing a physical action performed by a wearer.

3. The method of claim 2, wherein the pictogram, the logogram, the ideogram, the emoji or the combination thereof represents the physical action of at least one of thumbs up, clapping, clapping, waving, beckoning, head nodding, head shaking, or a combination thereof.

4. The method of claim 1, wherein the sensor data includes data from at least one of a motion sensor, environmental sensor, biosensor, imaging sensor, or a combination thereof.

5. The method of claim 1, wherein the at least one wearable device is at least one of a smart watch, smart jewelry, smart glasses, smart clothing, or a combination thereof.

6. The method of claim 1, wherein identifying the one or more expressions based on the sensor data comprises comparing the sensor data to one or more predefined patterns for the one or more expressions.

7. The method of claim 1, further comprising:
identifying a user associated with the at least one wearable device;

associating at least one of the one or more expressions with the identified user.

8. A system comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to:
connect to at least one wearable device;
connect to a virtual conference device connected to a virtual conference hosted by a virtual conference provider;
receive sensor data from the at least one wearable device;
identify one or more expressions based on the sensor data; and
transmit the identified one or more expressions to the virtual conference device to be provided to the virtual conference provider for conveyance within the virtual conference.

9. The system of claim 8, wherein the one or more expressions any combination of a pictogram, a logogram, an ideogram, an emoji or combination thereof presented within the virtual conference and representing a physical action performed by a wearer.

10. The system of claim 9, wherein the pictogram, the logogram, the ideogram, the emoji or the combination thereof represents the physical action of at least one of thumbs up, clapping, clapping, waving, beckoning, head nodding, head shaking, or a combination thereof.

11. The system of claim 8, wherein the sensor data includes data from at least one of a motion sensor, environmental sensor, biosensor, imaging sensor, or a combination thereof.

12. The system of claim 8, wherein the at least one wearable device is at least one of a smart watch, smart jewelry, smart glasses, smart clothing, or a combination thereof.

13. The system of claim 8, wherein identifying the one or more expressions based on the sensor data comprises comparing the sensor data to one or more predefined patterns for the one or more expressions.

14. The system of claim 8, further comprising:
identifying a user associated with the at least one wearable device;
associating at least one of the one or more expressions with the identified user.

15. A non-transitory computer-readable medium comprising processor-executable instructions configured to cause one or more processors to:
connect to at least one wearable device;
connect to a virtual conference device connected to a virtual conference hosted by a virtual conference provider;
receive sensor data from the at least one wearable device;
identify one or more expressions based on the sensor data; and
transmit the identified one or more expressions to the virtual conference device to be provided to the virtual conference provider for conveyance within the virtual conference.

16. The non-transitory computer-readable medium of claim 15, wherein:
the one or more expressions any combination of a pictogram, a logogram, an ideogram, an emoji or combination thereof presented within the virtual conference and representing a physical action performed by a wearer; and
the pictogram, the logogram, the ideogram, the emoji or the combination thereof represents the physical action of at least one of thumbs up, clapping, clapping, waving, beckoning, head nodding, head shaking, or a combination thereof.

17. The non-transitory computer-readable medium of claim 15, wherein the sensor data includes data from at least one of a motion sensor, environmental sensor, biosensor, imaging sensor, or a combination thereof.

18. The non-transitory computer-readable medium of claim 15, wherein the at least one wearable device is at least one of a smart watch, smart jewelry, smart glasses, smart clothing, or a combination thereof.

19. The non-transitory computer-readable medium of claim 15, wherein identifying the one or more expressions based on the sensor data comprises comparing the sensor data to one or more predefined patterns for the one or more expressions.

20. The non-transitory computer-readable medium of claim 15, further comprising:
identifying a user associated with the at least one wearable device;
associating at least one of the one or more expressions with the identified user.

* * * * *